(12) United States Patent
Shimizu (10) Patent No.: US 9,299,147 B2
(45) Date of Patent: Mar. 29, 2016

(54) IMAGE PROCESSING APPARATUS, IMAGE CAPTURING APPARATUS, AND IMAGE PROCESSING METHOD

(71) Applicant: CANON KABUSHIKI KAISHA, Tokyo (JP)

(72) Inventor: Yusuke Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/461,781

(22) Filed: Aug. 18, 2014

(65) Prior Publication Data

US 2015/0055888 A1    Feb. 26, 2015

(30) Foreign Application Priority Data

Aug. 20, 2013  (JP) .................................. 2013-170828
Aug. 20, 2013  (JP) .................................. 2013-170829

(51) Int. Cl.
*G06K 9/32*  (2006.01)
*G06T 7/00*  (2006.01)
*G06T 5/00*  (2006.01)

(52) U.S. Cl.
CPC .............. *G06T 7/0028* (2013.01); *G06T 5/008* (2013.01); *G06T 7/003* (2013.01); *G06T 2207/20208* (2013.01)

(58) Field of Classification Search
USPC ................. 382/294, 295, 274; 348/136, 234, 348/229.1, 208.6, 221.1
See application file for complete search history.

(56) References Cited

U.S. PATENT DOCUMENTS 8,212,871 B2 * 7/2012 Tonogai et al. ............... 348/136
8,947,556 B2 * 2/2015 Kobayashi ................ 348/229.1

FOREIGN PATENT DOCUMENTS

JP    2008-109176 A    5/2008

\* cited by examiner

*Primary Examiner* — Anh Do
(74) *Attorney, Agent, or Firm* — Cowan, Liebowitz & Latman, P.C.

(57) ABSTRACT

An image processing apparatus comprises an acquisition unit configured to acquire a plurality of images captured under different exposure conditions, a detection unit configured to detect a position shift of an image to the reference image, wherein the reference image is an image serving as an alignment reference in processing for composing the plurality of images; and a composition unit configured to correct the position shift and compose the plurality of images in accordance with a composition ratio calculated based on brightness of a predetermined image, wherein the composition unit does not compose a plurality of images according to the composition ratio in a region of the reference image in which at least parts of the plurality of images do not overlap, and the composition unit composes images generated from the predetermined image.

15 Claims, 5 Drawing Sheets

IMAGE PROCESSING APPARATUS, IMAGE CAPTURING APPARATUS, AND IMAGE PROCESSING METHOD

BACKGROUND OF THE INVENTION

1. Field of the Invention

The present invention relates to a technique for controlling enlargement of a dynamic range in an image capturing apparatus.

2. Description of the Related Art

In general, to obtain one image, there is known dynamic range enlargement control for composing a plurality of images into one image to generate an image having a wide dynamic range. This control aims at improving an image quality by generating a composite image using images shot under different exposure conditions. Since shooting is performed a plurality of times, the shooting timings of the respective images are different from each other. For example, when a moving object is shot, images may often be shot at different angles of view.

Japanese Patent Laid-Open No. 2008-109176 discloses a method of outputting a plurality of captured images by performing exposure a plurality of times and multiplying the output images by a gain calculated by a ratio of the average luminance value of reference image data and a reference luminance value, thereby equalizing the brightness of the reference image data and the brightness of non-reference image data to detect a position shift. Using the position shift detection result, the position shift of an image obtained before gain multiplication is corrected, and image composition is performed.

Figure 2:
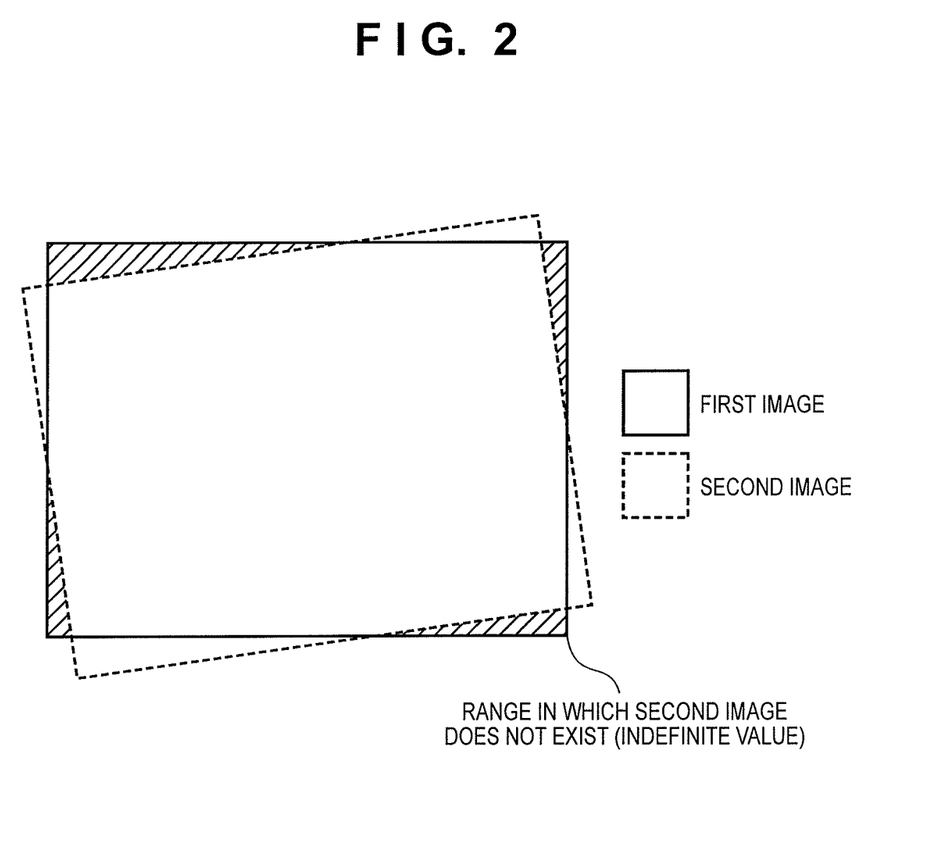
FIG. 2 is a view showing the concept of image alignment.

However, in Japanese Patent Laid-Open No. 2008-109176, for example, assume that an image is rotated for alignment. Since one image does not have peripheral pixels in image composition, as shown in FIG. 2, a desired image may not be obtained in the peripheral portion of the composite image.

SUMMARY OF THE INVENTION

The present invention has been made in consideration of the above problem to make it possible to maintain the angle of view of a composite image in processing of aligning a plurality of images captured in different exposure conditions and composing the images.

According to the first aspect of the present invention, there is provided an image processing apparatus comprising: an acquisition unit configured to acquire a plurality of images captured under different exposure conditions; a detection unit configured to detect a position shift of an image except a reference image in the plurality images with reference to the reference image, wherein the reference image is an image serving as an alignment reference in processing for composing the plurality of images; and a composition unit configured to correct the position shift and compose the plurality of images in accordance with a composition ratio calculated based on brightness of a predetermined image included in the plurality of images, wherein the composition unit does not compose a plurality of images according to the composition ratio in a region of the reference image in which at least parts of the plurality of images do not overlap, and the composition unit composes images generated from the predetermined image.

According to the second aspect of the present invention, there is provided an image processing method comprising: an acquisition step of acquiring a plurality of images captured under different exposure conditions; a detection step of detecting a position shift of an image except a reference image in the plurality images with reference to the reference image, wherein the reference image is an image serving as an alignment reference in processing for composing the plurality of images; and a composition step of correcting the position shift and compose the plurality of images in accordance with a composition ratio calculated based on brightness of a predetermined image included in the plurality of images, wherein in the composition step, a plurality of images are not composed according to the composition ratio in a region of the reference image in which at least parts of the plurality of images do not overlap, and images generated from the predetermined image are composed.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

First Embodiment

Figure 1:
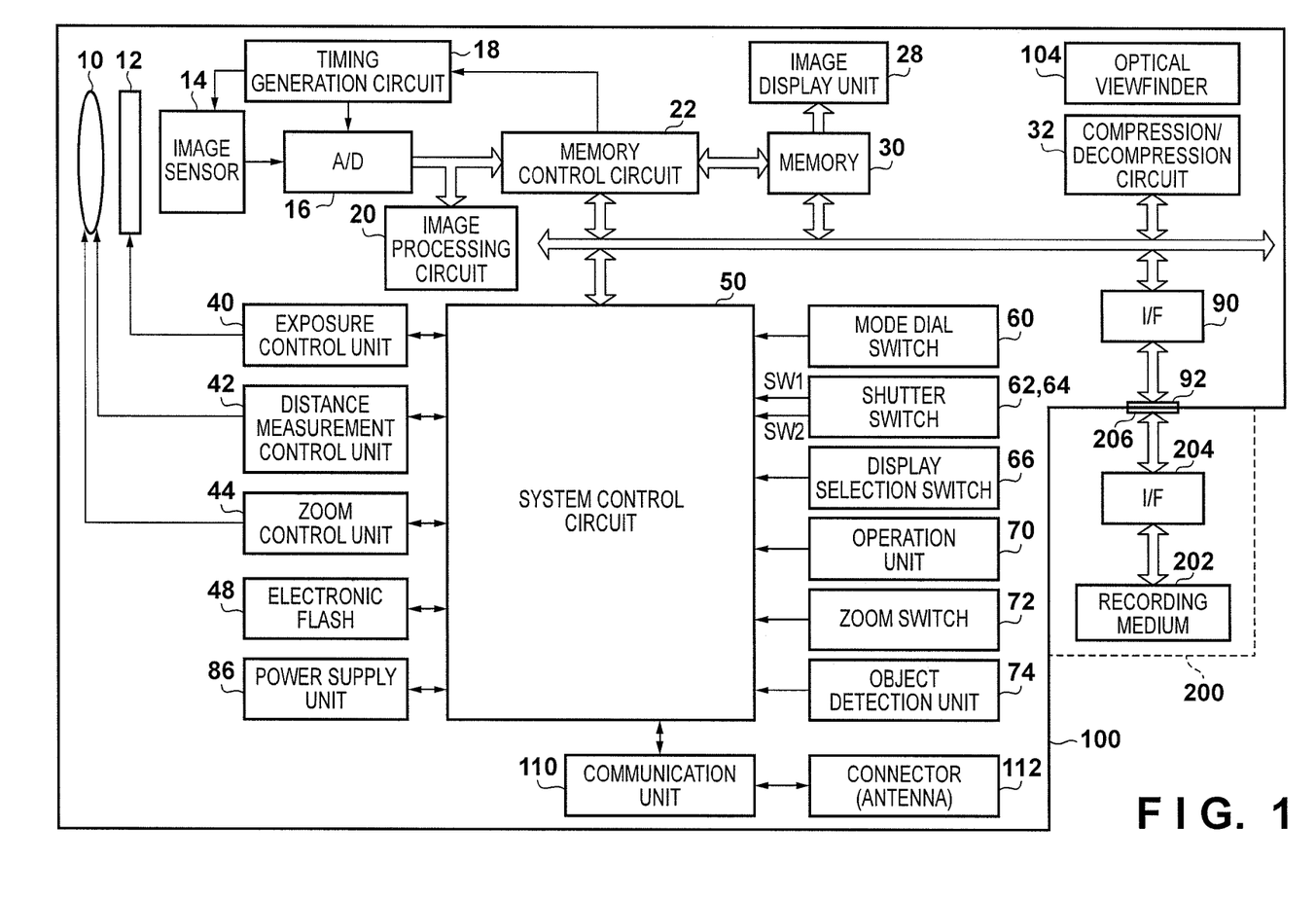
FIG. 1 is a block diagram of a digital camera as the first embodiment of an image capturing apparatus according to the present invention.

FIG. 1 is a block diagram of a digital camera 100 as the first embodiment of an image capturing apparatus according to the present invention.

Referring to FIG. 1, the digital camera includes a shooting lens 10. A mechanical shutter 12 has a stop function. An image sensor 14 converts an optical image into an electrical signal. An A/D converter 16 converts an analog signal output from the image sensor 14 into a digital signal.

A timing generation circuit 18 supplies clock signals and control signals to the image sensor 14 and the A/D converter 16. The timing generation circuit 18 is controlled by a memory control circuit 22 and a system control circuit 50. In addition to the mechanical shutter 12, the digital camera includes an electronic shutter to control the accumulation time by controlling the reset timings of the image sensor 14. The digital camera can be used for capturing a moving image.

An image processing circuit 20 performs predetermined pixel interpolation processing and color conversion processing for data from the A/D converter 16 or data from the memory control circuit 22. The image processing circuit 20 extracts an image and performs zooming, thereby implementing an electronic zoom function.

The image processing circuit 20 performs predetermined arithmetic processing using the captured image data. The system control circuit 50 performs AF processing, AE processing, and EF processing for controlling an exposure control unit 40 and a distance measurement control unit 42 using the resultant arithmetic result. The image processing circuit 20 performs predetermined arithmetic processing using the captured image data and also performs AWB (Auto White Balance) processing based on the resultant arithmetic result.

The memory control circuit 22 controls the A/D converter 16, the timing generation circuit 18, the image processing circuit 20, a memory 30, and a compression/decompression circuit 32. The data from the A/D converter 16 is written in the memory 30 via the image processing circuit 20 and the memory control circuit 22. Alternatively, the data from the A/D converter 16 is written in the memory 30 via only the memory control circuit 22. An image display unit 28 includes an TFT LCD or the like. The display image data written in the memory 30 is displayed on the image display unit 28 via the memory control circuit 22.

When the captured image data are sequentially displayed using the image display unit 28, the electronic viewfinder function can be implemented. The image display unit 28 can arbitrarily change the display between ON and OFF according to an instruction from the system control circuit 50. When the display is set OFF, the power consumption of the digital camera 100 can be greatly reduced.

The memory 30 stores the captured still images and moving images. The memory 30 has a storage capacity enough to store a predetermined number of still images and a moving image of a predetermined time. Images can be written in the memory 30 at high speed in a large volume in panoramic shooting and continuous shooting for continuously shooting a plurality of still images. The memory 30 can also be used as a work area for the system control circuit 50.

The compression/decompression circuit 32 compresses and decompresses image data using ADCT (Adaptive Discrete Cosine Transform). The compression/decompression circuit 32 receives an image stored in the memory 30 and performs compression processing or decompression processing of the image. The processed data is written in the memory 30.

The exposure control unit 40 controls the shutter 12 having the stop function. The exposure control unit 40 also has flash light control function in synchronism with an electronic flash 48. The distance measurement control unit 42 controls focusing of the shooting lens 10. A zoom control unit 44 controls zooming of the shooting lens 10.

The electronic flash 48 has an AF auxiliary light projection function and the flash light control function. The exposure control unit 40 and the distance measurement control unit 42 are controlled using the TTL method. The system control circuit 50 controls the exposure control unit 40 and the distance measurement control unit 42 based on the arithmetic result of the captured image data from the image processing circuit 20. The system control circuit 50 controls the entire system of the digital camera 100.

Operation members 60, 62, 64, 66, 70, and 72 are used to input various operation instructions to the system control circuit 50. These operation members are formed from switches, a dial, a touch panel, a pointing element using line-of-sight detection, a speech recognition device, and the like singly or in a combination. A detailed explanation of these operation members will be made below.

The mode dial switch 60 switches a variety of functional modes such as power off, automatic shooting mode, shooting mode, panoramic shooting mode, moving image capturing mode, playback mode, and PC connection mode.

The shutter switch SW1 62 is half depressed (half stroke) and turned on and instructs the start of operation such as AF (Auto Focus) processing, AE (Auto Exposure) processing, and AWB (Auto White Balance) processing. The shutter switch SW2 64 is fully depressed (full stroke) and turned on. In electronic flash shooting, EF (Electronic Flash pre-emission) is performed, and the image sensor 14 is exposed for an exposure time determined by AE processing. The electronic flash emits light during this exposure period, and the exposure control unit 40 controls to turn off the electronic flash at the end of the exposure period, thereby completing the exposure to the image sensor 14. After that, readout processing for writing, as image data in the memory 30 via the A/D converter 16 and the memory control circuit 22, the signal read out from the image sensor 14, and development processing using arithmetic operations in the image processing circuit 20 and the memory control circuit 22 are performed. In addition, recording processing for reading out image data from the memory 30, compressing it by the compression/decompression circuit 32, and writing the image data on a recording medium 200 is performed. The shutter switch SW2 instructs the start of a series of shooting processing operations.

The display selection switch 66 can perform display selection of the image display unit 28. When shooting is performed using an optical viewfinder 104 using the above function, a current is cut off from the image display unit made of a TFT LCD or the like, thereby achieving power saving.

The operation unit 70 includes various buttons, a touch panel, and a rotary dial, and namely a menu button, set button, macro button, multi-screen playback repagination button, electronic flash setting button, single shooting/continuous shooting/self-timer selection button, and the like. The operation unit 70 also includes a menu move + (plus) button, menu move − (minus) button, playback image move + (plus) button, playback image move − (minus) button, shooting image quality selection button, exposure correction button, date/time setting button, and the like.

The zoom switch 72 serves as a zoom operation unit for allowing the user to instruct the zoom ratio of a captured image. The zoom switch 72 includes a tele switch for changing the shooting angle of view toward the telephoto side and a wide switch for changing the shooting angle of view toward the wide-angle side. The use of this zoom switch 72 causes the zoom control unit 44 to trigger the instruction for changing the shooting angle of view of the shooting lens 10 and the optical zoom operation. The use of the zoom switch 72 also triggers image extraction by the image processing circuit 20 and the change in electronic zooming in shooting angle of view using pixel interpolation processing or the like.

A power supply unit 86 is made of a primary battery such as an alkali battery, a secondary battery such as an NiCd battery, NiMH, battery, or Li ion battery, or an AC adapter. An interface 90 serves as an interface with a memory card, hard disk, or the like. A connector 92 connects to a recording medium such as a memory card or hard disk.

The optical viewfinder 104 can perform shooting singly without using the electronic viewfinder function of the image display unit 28. A communication unit 110 has various communication functions such as USB, IEEE1394, LAN, and wireless communication. Reference numeral 112 denotes a connector for connecting the digital camera 100 to another device, or an antenna for wireless communication, using the communication unit 110.

The recording medium 200 is made of a memory card, hard disk, or the like. The recording medium 200 includes a recording unit 202 made of a semiconductor memory, magnetic disk, or the like, an interface 204 with the digital camera 100, and a connector 206 connected to the digital camera 100.

Figure 3:
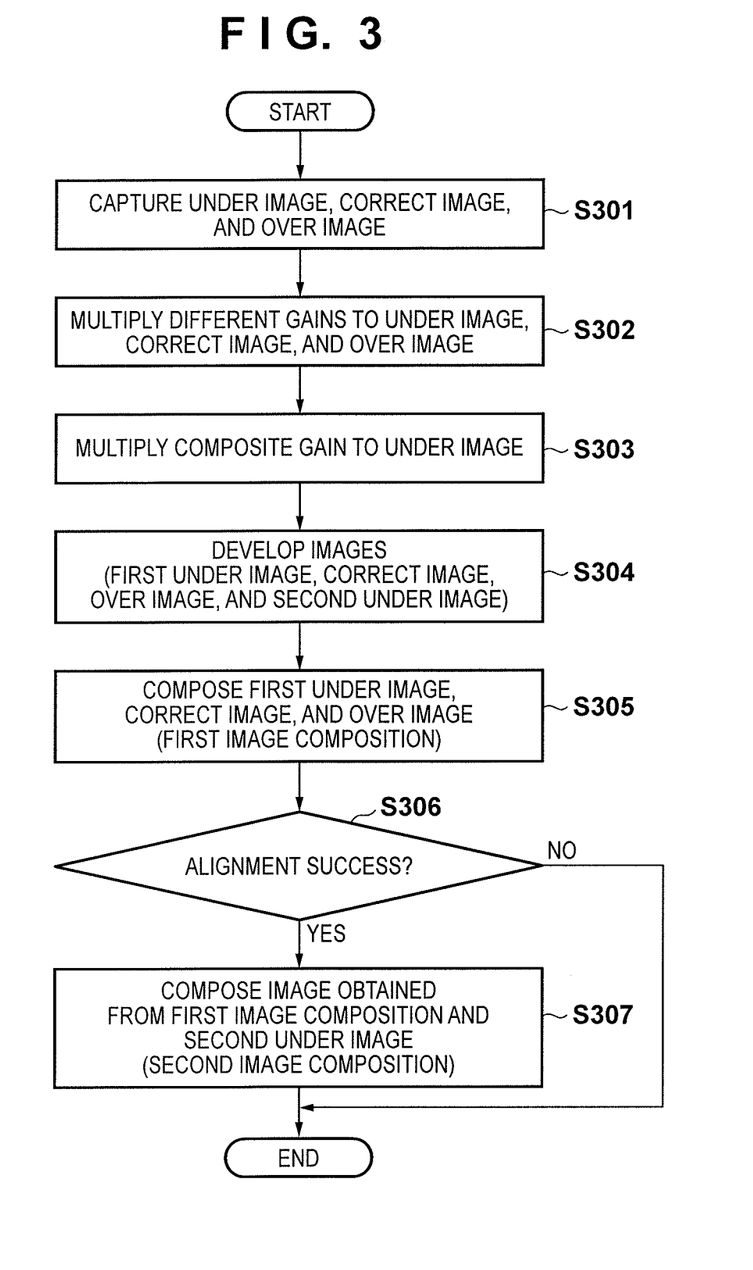
FIG. 3 is a flowchart showing the operation of the digital camera according to the first embodiment of the present invention.

FIG. 3 is a flowchart showing the operation of the digital camera according to this embodiment.

In step S301, the user shoots three images under different exposure conditions, that is, an under image (underexposure image), a correct image (correct exposure image), and an over image (overexposure image). In step S302, different gains are multiplied to the under image, correct image, and over image obtained in step S301. At this time, optimal gains are multiplied to the images, respectively. That is, gains are set such that the respective images have brightness levels, respectively, corresponding to the correct exposure.

In step S303, a composite gain obtained by composing the gains of the respective images as indicated by equation (1) is multiplied to one under image obtained in step S301. A composite gain Gg(Y) is given by:

$$Gg(Y)=\alpha*Gl(Y)+\beta*Gm(Y)+\gamma*Gh(Y) \quad (1)$$

for $\alpha+\beta+\gamma=1$, $0\leq\alpha\leq1$, $0\leq\alpha\leq1$, $0\leq\beta\leq1$, $0\leq\gamma\leq1$
where Y is the pixel luminance value of the under image, Gl(Y), Gm(Y), and Gh(Y) are the under image gain, correct image gain, and over image gain, respectively, $\alpha$, $\beta$, and $\gamma$ are parameters representing the composition ratios of the under image, correct image, and over image. The composition ratios of the gains of the respective images are adjusted such that the under image has a brightness level corresponding to the correct exposure by multiplying the composite gain, thereby determining the gains. In this case, the composition ratio is adjusted, and a gain equal to the gain used in the under image in step S302 is applied.

In step S304, the images (first under image, correct image, and over image) obtained in step S302 and the image (second under image) obtained in step S303 are developed. In this embodiment, "first under image=second under image" may be set, and development may be done at once.

Figure 4:
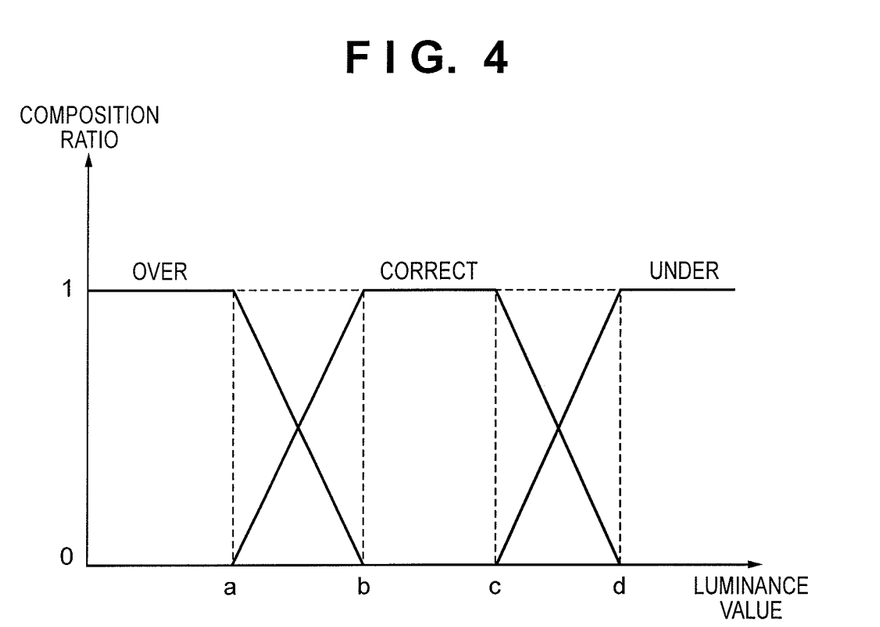
FIG. 4 is a view showing the relationship between luminance values and composition ratios.

In step S305, the first under image, correct image, and over image obtained in step S304 are composed. The three images to be composed are given as aligned images. For example, image rotation or the like is performed to align the correct image on the first under image, align the over image on the first under image, and compose the aligned correct and over images with the first under image. More specifically, out of the plurality of images, the position shifts of images except the reference image are detected with reference to the reference image, and the images free from the position shifts are composed to obtain a composite image. At this time, the composition ratio of the image is determined, for example, based on a luminance value Yl of each pixel of the first under image, as shown in FIG. 4, using equation (2), that is, a pixel value G of the composite image:

$$G=\alpha2*L+\beta2*M+\gamma2*H \quad (2)$$

for
$\alpha2=0$, $\beta2=0$, $\gamma2=1$ if $0\leq Yl\leq a$
$\alpha2=0$, $\beta2=(Yl-a)/((b-a)$, $\gamma2=1-\beta2$ if $a\leq Yl\leq b$
$\beta2=0$, $\beta2=1$, $\gamma2=0$ if $b\leq Yl\leq c$
$\alpha2=(Yl-c)/(-c)$, $\beta2=1-\alpha2$, $\gamma2=0$, if $c\leq Yl\leq d$
$\alpha2=1$, $\beta2=0$, $\gamma2=0$ if $d\leq Yl$
where L, M, and H are the pixel values of the under image, correct image, and over image, respectively, and $\alpha2$, $\beta2$, and $\gamma2$ are parameters representing the composition ratios of the under image, correct image, and over image, respectively. More specifically, a low-luminance pixel is applied from the over image, a medium-luminance pixel is applied from the correct image, and a high-luminance pixel is applied from the under image. The levels between them are made linear. When differences between the angles of view of the images are large and alignment fails, the first under image is made as the final output (step S306).

Figure 5:
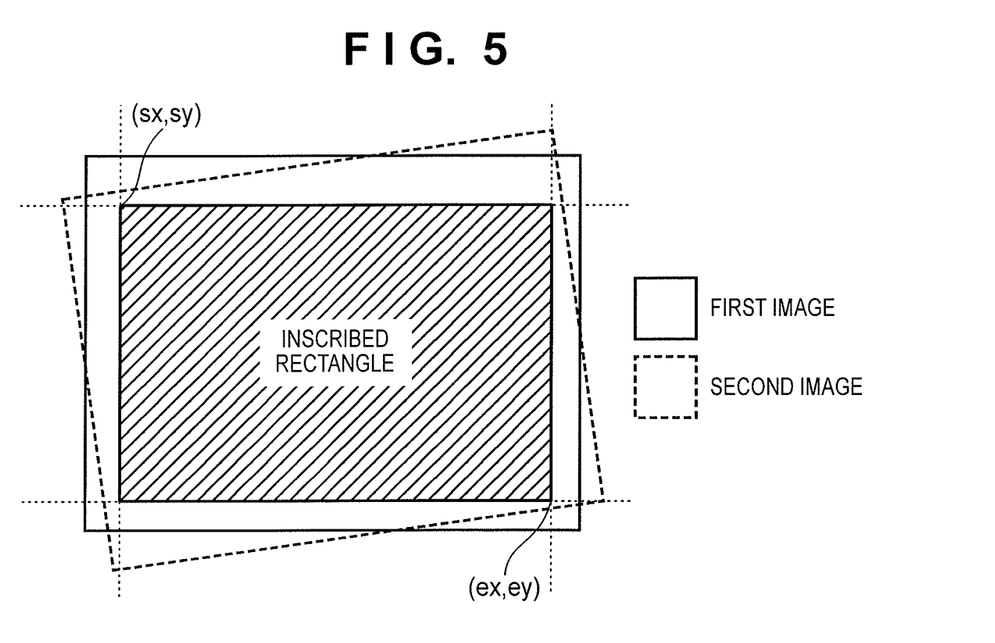
FIG. 5 is a view showing an inscribed rectangle in image alignment.

In step S307, the second under image obtained in step S304 and the output image in step S305 are composed. In this embodiment, to simplify the hardware configuration and reduce the processing cost, as shown in FIG. 5, the coordinates of an inscribed rectangle (rectangle region) with respect to two images to be composed are calculated, and outer pixels of the inscribed rectangle are replaced with the second under image. The resultant images are then composed. That is, the reference image is used regardless of image brightness in a predetermined region including a region in which parts of the plurality of aligned images do not overlap in the reference image. The inscribed rectangle serves as an alignment target and is a region in an output image defined by intersections obtained by extending lines parallel or perpendicular to the sides of the reference image from the respective vertices of a geometrically deformed image. The image processing circuit 20 according to this embodiment has a hardware configuration which calculates the coordinates of the above inscribed rectangle and performs processes inside and outside the rectangle separately. Alternatively, the composition ratios of the two images are linearly changed with a predetermined width for the boundary portion defining the inside and outside of the inscribed rectangle, thereby making the boundary unnoticeable.

As described above, according to this embodiment, in processing for aligning and composing a plurality of images captured under different exposure conditions, the reference image is used as an image in a region in which at least one image does not exist except the image (under image) serving as the alignment reference in the composite image. This makes it possible to maintain, in the composite image, the angles of view of the images before the composition.

Second Embodiment

The second embodiment will now be described below. The arrangement of a digital camera according to the second embodiment as an example of the image capturing apparatus of the present invention is the same as the arrangement of the digital camera 100 according to the first embodiment shown in FIG. 1. A description of the digital camera of the second embodiment will be omitted.

The operation of the digital camera of this embodiment is the same as that of the first embodiment shown in FIG. 3 except steps S302 and S303. The rest of processing is the same as that of the first embodiment, and the explanation of the common part will be omitted.

In step S302, each of an under image, correct image, and over image obtained in step S301 is divided into M×N blocks. In each block, the signals values of the respective pixels are added and averaged to obtain a signal value of each block. A gain is multiplied to each image based on the signal value of each block. At this time, the gains are set such that the output pixel values (output values) of the gained images increase in the order of the under image, correct image, and over image. With this arrangement, for example, when an object and a background are present in a composite image in step S305, an effect can be produced such that the background around the object may be made bright as if backlight were emitted to the object or an image has an atmosphere as if a shadow were formed.

In step S303, a composite gain generated by composing the gains of the respective images as indicated by equation (1) is multiplied to the under image obtained in step S301. At this time, the gain is composed based on the composition ratio of the image as indicated by equation (2) used for composition in step S305. The composition ratio of the image here is the composition ratio for the developed image. For this reason, the composition ratio can be used by converting it into the composition ratio of the image before the development. With this operation, during image composition in step S307, the brightness step between the inside of the image and the peripheral portion of the image can be made unnoticeable, thereby providing a desirable image to the user.

As described above, according to this embodiment, in processing for aligning and composing a plurality of images captured under different exposure conditions, the reference image is used as an image in a region in which at least one image does not exist except the image serving as the alignment reference in the composite image. This makes it possible to maintain, in the composite image, the angles of view of the images before the composition.

Third Embodiment

The third embodiment will now be described below. The arrangement of a digital camera according to the third embodiment is the same as the arrangement of the digital camera 100 according to the first embodiment shown in FIG. 1. A description thereof will be omitted.

Figure 6:
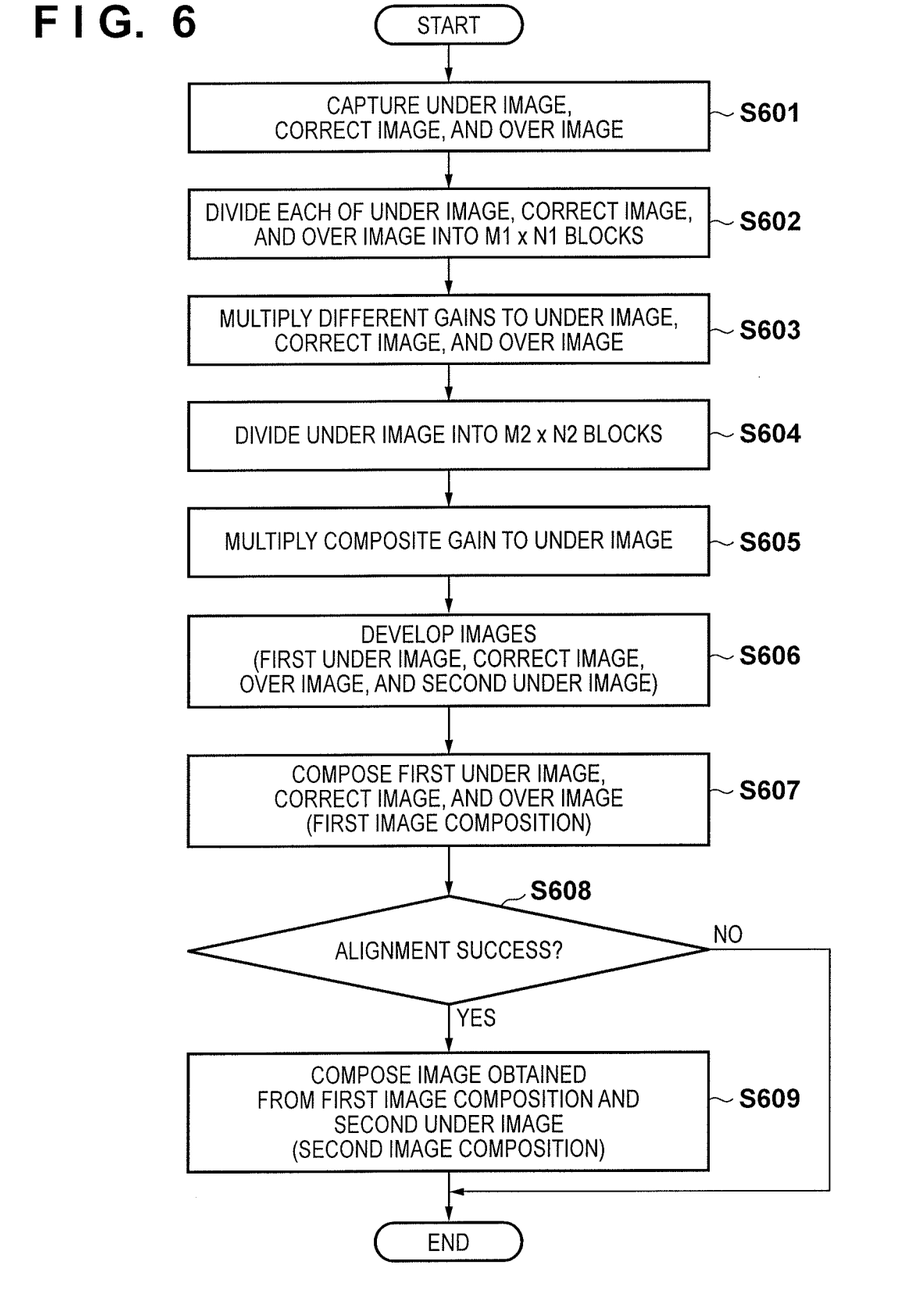
FIG. 6 is a flowchart showing the operation of a digital camera according to the third embodiment of the present invention.

FIG. 6 is a flowchart showing the operation of the digital camera according to this embodiment.

In step S601, the user shoots three images under different exposure conditions, that is, an under image (underexposure image), a correct image (correct exposure image), and an over image (overexposure image).

In step S602, the under image, correct image, and cover image obtained in step S601 are divided into M1×N1 blocks. The signal values of the pixels of each block are added and averaged to obtain a signal value of each block.

A gain is multiplied to each image based on the signal value of each block in step S603. At this time, the gains are set such that the output pixel values (output values) of the gained images increase in the order of the under image, correct image, and over image. With this arrangement, for example, when an object and a background are present in a composite image in step S607, an effect can be produced such that the background around the object may be made bright as if backlight were emitted to the object or an image has an atmosphere as if a shadow were formed.

In step S604, the under image obtained in step S601 is divided into M2×N2 (M2>M1 and N2>N1) blocks. The signals values of the pixels of each block are added and averaged to calculate a signal value of each block. The division number is increased to improve precision of the signal value of each bock and prevent occurrence of the luminance step in image composition in step S609.

In step S605, a composite gain obtained by composing the gains of the respective images as indicated by equation (3) is multiplied to one under image obtained in step S601. A composite gain Gg(Y) is given by:

$$Gg(Y)=\alpha*Gl(Y)+\beta*Gm(Y)+\gamma*Gh(Y) \quad (3)$$

for $\alpha+\beta+\gamma=1$, $0\leq\alpha\leq1$, $0\leq\beta\leq1$, $0\leq\gamma\leq1$
where Y is the pixel luminance value of the under image, Gl(Y), Gm(Y), and Gh(Y) are the under image gain, correct image gain, and over image gain, respectively, $\alpha$, $\beta$, and $\gamma$ are parameters representing the composition ratios of the under image, correct image, and over image, respectively. At this time, gains are composed based on the composition ratios of the images shown in FIG. 4 which are used for composition in step S607. Since the composition ratios of the images are the composition ratios of the developed images, the composition ratios are converted into the composition ratios of the images before the development, thereby determining the gain.

In step S606, the images (first under image, correct image, and over image) obtained in step S603 and the image (second under image) obtained in step S605 are developed.

In step S607, the first under image, correct image, and over image obtained in step S606 are composed. The three images to be composed are given as aligned images. For example, image rotation or the like is performed to align the correct image on the first under image, align the over image on the first under image, and compose the aligned correct and over images with the first under image. More specifically, out of the plurality of images, the position shifts of images except the reference image are detected with reference to the reference image, and the images free from the position shifts are composed to obtain a composite image. At this time, the composition ratio of the image is determined, for example, based on a luminance value Yl of each pixel of the first under image, as shown in FIG. 4, using equation (4), that is, a pixel value G of the composite image:

$$G=\beta2*L+\beta2*M+\gamma2*H \quad (4)$$

for
$\alpha2=0$, $\beta2=0$, $\gamma2=1$ if $0\leq Yl\leq a$
$\alpha2=0$, $\beta2=(Yl-a)/(b-a)$, $\gamma2=1=\beta1$ if $a\leq Yl\leq b$
$\alpha2=0$, $\beta2=1$, $\gamma2=0$ if $b\leq Yl\leq c$
$\alpha2=(Yl-c)/(d-c)$, $\beta2=1-\alpha2$, $\gamma2=0$ if $c\leq Yl\leq c$
$\alpha2=1$, $\beta2=0$, $\gamma2=0$ if $d\leq Yl$
where L, M, and H are the pixel values of the under image, correct image, and over image, respectively, and $\alpha2$, $\beta2$, and $\gamma2$ are parameters representing the composition ratios of the under image, correct image, and over image, respectively. More specifically, a low-luminance pixel is applied from the over image, a medium-luminance pixel is applied from the correct image, and a high-luminance pixel is applied from the first under image. The levels between them are made linear. When differences between the angles of view of the images are large and alignment fails, the first under image is made as the final output (step S608).

In step S609, the second under image obtained in step S606 and the output image obtained in step S607 are composed. When alignment is performed in step S607, in this embodiment, to simplify the hardware configuration and reduce the processing cost, as shown in FIG. 5, the coordinates of an inscribed rectangle with respect to two images to be composed are calculated, and outer pixels of the inscribed rectangle in the output image obtained in step S606 are replaced with the second under image obtained in step S606. The resultant images are then composed. That is, the reference image is used regardless of image brightness in a predetermined region including a region in which parts of the plurality of aligned images do not overlap in the reference image. The inscribed rectangle serves as an alignment target and is a region in an output image defined by intersections obtained by extending lines parallel or perpendicular to the sides of the reference image from the respective vertices of a geometrically deformed image. The image processing circuit 20 has a hardware configuration which calculates the coordinates of the above inscribed rectangle and performs processes inside and outside the rectangle separately. Alternatively, the composition ratios of the two images are linearly changed with a predetermined width for the boundary portion defining the inside and outside of the inscribed rectangle, thereby making the boundary unnoticeable. With this arrangement, it is possible to make the luminance step between the inside of the image and the peripheral portion of the image unnoticeable when performing image composition in step S609, thereby providing a desirable image to the user.

As described above, according to this embodiment, in processing for aligning and composing a plurality of images captured under different exposure conditions, the reference image is used as an image in a region in which at least one image does not exist except the image serving as the alignment reference in the composite image. This makes it possible to maintain, in the composite image, the angles of view of the images before the composition.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-170828 filed Aug. 20, 2013 and Japanese Patent Application No. 2013-170829 filed Aug. 20, 2013 which are hereby incorporated by reference herein in their entirety.

What is claimed is:

1. An image processing apparatus comprising:
   a processor for executing a program stored in a memory to implement:
   acquiring a plurality of images captured under different exposure conditions;
   detecting a position shift of an image except a reference image in the plurality images with reference to the reference image, wherein the reference image is an image serving as a reference in processing for composing the plurality of images; and
   correcting the position shift and composing the plurality of images in accordance with a composition ratio calculated based on brightness of a predetermined image included in the plurality of images,
   wherein said processor does not compose a plurality of images according to the composition ratio in a predetermined region of the reference image including a region in which at least parts of the plurality of images do not overlap, and said processor uses an image generated from the reference image in the predetermined region.

2. The apparatus according to claim 1, wherein said processor composes the image generated from the reference image in the predetermined region of the reference image outside a rectangular region in which a plurality of images having undergone position shift correction overlap.

3. The apparatus according to claim 1, wherein the processor is further configured to set gains based on brightness levels of the plurality of images,
   wherein said processor composes the plurality of images to which the gains are applied, and composes, in the predetermined region including the region in which at least parts of the plurality of images do not overlap, the image generated by applying, to the reference image, a composite gain obtained by composing gains in accordance with the composition ratios.

4. The apparatus according to claim 3, wherein said processor divides each of the plurality of images into blocks, and sets the gain based on a signal value calculated by adding and averaging signal values of each block.

5. The apparatus according to claim 3, wherein said processor sets the gain in descending order of exposure levels of the plurality of images, which are represented by output values obtained upon respectively applying the gains to the plurality of images.

6. The apparatus according to claim 1, wherein the reference image is an image having a lowest exposure level in the plurality of images.

7. The apparatus according to claim 1, wherein said processor divides the reference image into M2 ×N2 (M2 >M1 and N2 >N1) and calculates the composition ratio based on the signal value calculated by adding and averaging the signal values of each block, and
   said processor divides each of the plurality of images into M1 ×N1 blocks and sets the gain based on a signal value calculated by adding and averaging signals values of each block.

8. An image capturing apparatus comprising:
   an image capturing device configured to capture images under different exposure conditions; and
   an image processing apparatus defined in claim 1.

9. An image processing method comprising:
   an acquisition step of acquiring a plurality of images captured under different exposure conditions;
   a detection step of detecting a position shift of an image except a reference image in the plurality images with reference to the reference image, wherein the reference image is an image serving as a reference in processing for composing the plurality of images; and
   a composition step of correcting the position shift and compose the plurality of images in accordance with a composition ratio calculated based on brightness of a predetermined image included in the plurality of images,
   wherein in the composition step, a plurality of images are not composed according to the composition ratio in a predetermined region of the reference image including a region in which at least parts of the plurality of images do not overlap, and an image generated from the reference image is used in the predetermined region.

10. An image processing apparatus comprising:
    a processor for executing a program stored in a memory to implement:
    acquiring a plurality of images captured under different exposure conditions;
    detecting a position shift of an image except a reference image in the plurality images with reference to the reference image, wherein the reference image is an image serving as a reference in processing for composing the plurality of images; and
    correcting the position shift and composing the plurality of images to generate a composite image,
    wherein said processor does not compose a plurality of images in a predetermined region of the reference image including a region in which at least parts of the plurality of images do not overlap, and uses the reference image as a part of the composite image.

11. The apparatus according to claim 10, wherein said processor uses the reference image as a part of the composite image outside a rectangular region in which the plurality of images having undergone position shift correction overlap.

12. The apparatus according to claim 10, wherein the processor is further configured to set gains based on brightness levels of the plurality of images,
wherein said processor composes the plurality of images to which the gains are applied, and uses, in the predetermined region including a region in which at least parts of the plurality of images do not overlap, an image generated by applying a composite gain obtained by composing gains to the reference image.

13. The apparatus according to claim 10, wherein the reference image is an image having a lowest exposure level in the plurality of images.

14. The apparatus according to claim 11, wherein the rectangular region is an inscribed rectangle region with respect to the plurality of images to be composed.

15. The apparatus according to claim 11, wherein the rectangular region is defined by extending lines parallel or perpendicular to the sides of the reference image from the respective vertices of the image having undergone position shift correction.

* * * * *